United States Patent Office 3,552,949
Patented Jan. 5, 1971

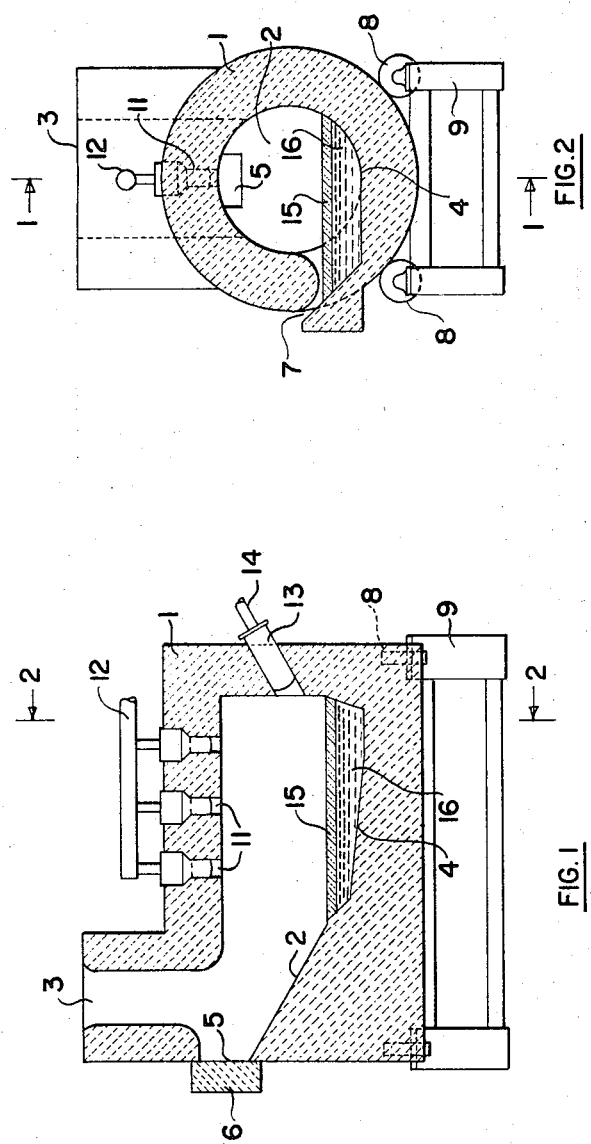

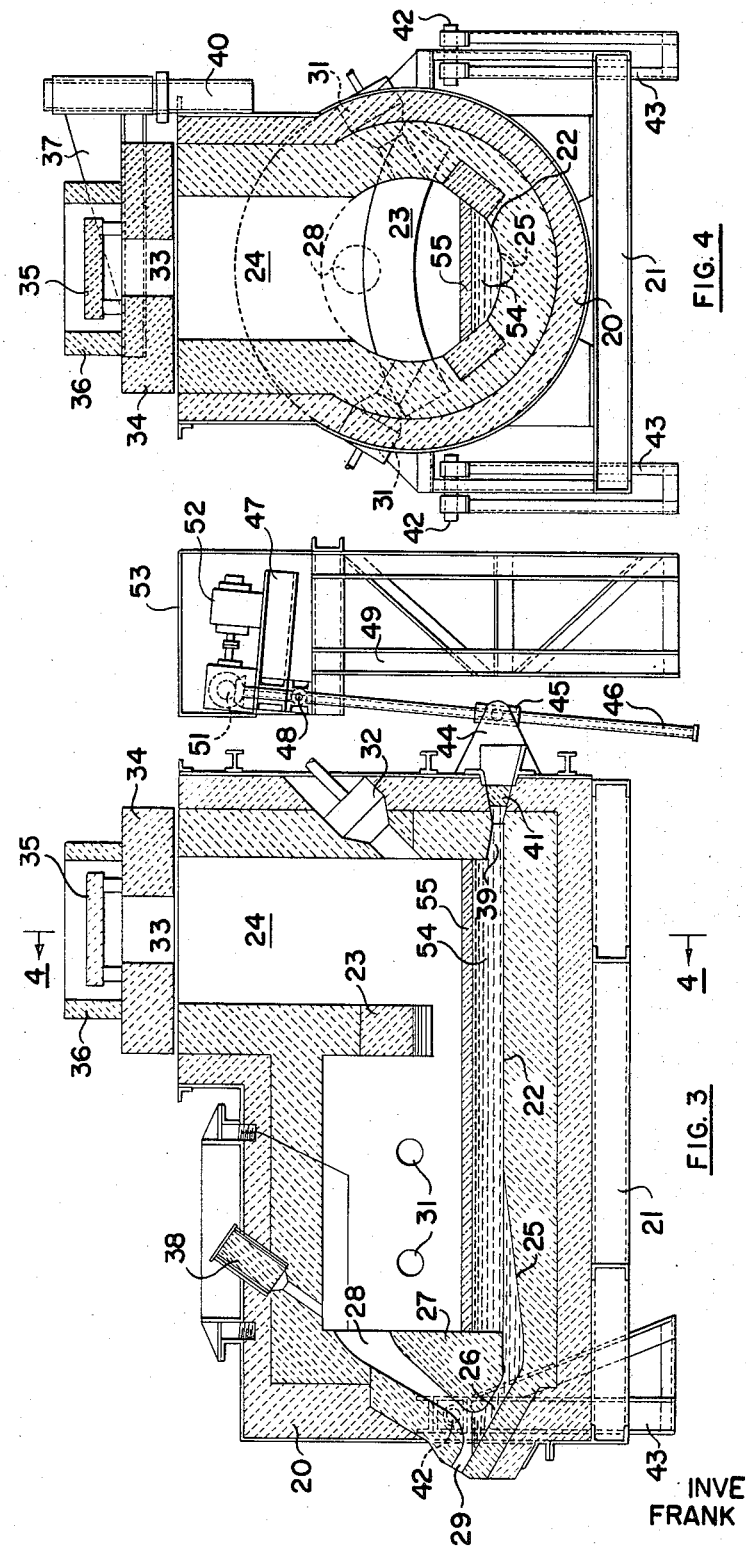

3,552,949
METAL MELTING PROCESS
Frank J. Boyle, Philadelphia, Pa., assignor to Selas Corporation of America, Dresher, Pa., a corporation of Pennsylvania
Filed Feb. 26, 1965, Ser. No. 435,654
Int. Cl. C22b 7/00
U.S. Cl. 75—65      4 Claims

ABSTRACT OF THE DISCLOSURE

Brass is melted by placing it in solid form under a bath of molten glass in a melting furnace chamber. Heat is applied to the glass and through the glass to the metal. The surface of the glass is rippled, by a stream of gases from a burner, to increase its surface area and the transfer of heat through it to the brass.

---

The present invention relates to the melting of metal, and more particularly to a method and apparatus for the melting of brass.

One of the problems that occur in a brass foundry is the changing composition of the brass as it is melted resulting from the volatilization of the zinc. This becomes acute when the brass must be held molten in a furnace for a period of time. Another problem is the loss of zinc and other metals in the form of oxides as a result of contact between the brass and products of combustion in the ordinary reverberatory furnace used for such melting.

It is an object of the present invention to provide a method of melting brass, or other metals, in such a fashion that little, if any, of the constituents thereof will be lost or contaminated. Another object of the invention is to melt brass under a blanket of material through which heat is transferred to the metal.

A further object of the invention is to provide a furnace in which brass, or other metal, can be melted rapidly without contamination.

It has been proposed prior to this time to cover metals, including brass, with a layer of some material such as slag or a flux to protect the metal and to increase the speed of melting. In these cases, however, the covering material did not do the actual melting. Frequently the cover resulted from the melting process itself and was considered a necessary evil. In any event, complete protection of the metal during the melting process was not obtained.

I have determined that if brass is melted when covered with a layer of liquid glass, the metal will be rapidly melted without a substantial change in composition. The glass, because of its affinity for oxides, will absorb many undesirable oxides that may be on the surface of or in the brass to be melted.

Glass has a wide melting range that starts below the melting point of brass so that it will be and remain at a low enough viscosity, as new metal is placed in it, to envelope the metal and begin to transfer heat to it. The heat is transferred to the metal from the glass by radiation through it and by conduction so that the emmisivity of the metal, which is kept bright, is not a factor in the heating time. Heat can be transferred to the glass from the furnace in any conventional manner, such as firing above its surface.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:
FIG. 1 is a section taken on line 1—1 of FIG. 2 longitudinally through the furnace,
FIG. 2 is a view taken on line 2—2 of FIG. 1,
FIG. 3 is a section view of a modified form of furnace, and
FIG. 4 is a transverse view taken on line 4—4 of FIG. 3.

Referring to FIG. 1 of the drawing, there is shown, somewhat diagrammatically, a furnace 1 which may be constructed in accordance with ordinary furnace practice. This furnace has a sloping dry hearth section 2 which is vertically below a stack 3. Connecting with the dry hearth 2 is a wet hearth 4 which holds the metal to be melted. There is provided a charge opening 5 in the end wall of the furnace which is normally closed by a door 6.

The side of the furnace is provided with a pouring opening 7 which, during the ordinary operation of the furnace, is above the level of the metal on the wet hearth and its covering of glass. The furnace can be discharged by rotating the entire furnace in a counterclockwise direction in FIG. 2 so that the metal is poured through a pouring opening 7. This rotating may be accomplished with any suitable and well known rotating mechanism. In order that this can be accomplished the furnace is mounted on a series of rollers 8 that are used to support the furnace above the floor line by means of a suitable frame 9.

In this embodiment of the invention, the furnace chamber is heated by means of a plurality of burners shown herein at 11 which are fired downwardly from the roof of the furnace and which are supplied with fuel and/or air through a pipe 12. There is also provided an additional burner 13 in the end wall of the furnace, the products of combustion from which are discharged against the surface of the material on the hearth. This latter burner is supplied with fuel and air through a pipe 14. It is noted that suitable, flexible connections will be used between the pipes 12 and 14 and the supplies of air and fuel, which flexible pipes will permit the furnace to be rotated.

There is shown in FIGS. 1 and 2 a body of metal 16 which is melted and which rests upon hearth 4. This body of metal is shown as being covered with a layer of molten glass 15.

In the operation of the furnace, a supply of glass cullet, such as ordinary soda-lime glass, sufficient to form a layer over the metal to be melted is placed in the furnace, and the burners lighted. When the glass is melted, brass in the form of ingots, bundles or scrap is placed on dry hearth 2 to be preheated by the products of combustion flowing to stack 3. The metal can be loaded either by dropping it onto the hearth through the stack or by opening door 6 and moving the metal onto the hearth through opening 5. In either case, when the metal is heated to about a red heat, and well before melting temperature is reached, it is pushed downwardly to wet hearth 4. Since the metal is much heavier than the glass, it will sink below the glass surface and be heated by conduction and radiation resulting from heat transfer through the glass.

Burners 11 can be of any suitable type that will produce enough heat to melt the load of metal. These burners will fill the furnace chamber with hot products of combustion, most of which will pass over hearth 2 to preheat metal thereon, and be discharged through stack 3. Some of these products of combustion, however, will be discharged through the pouring opening 7 and thereby serve to keep the walls of this opening hot so that the metal will not be chilled as it is poured.

Heat from the burners will also heat the interior walls of the furnace chamber to incandescence so that radiant heat from the walls will be directed toward the glass surface to increase the heating effect.

The use of the glass cover isolates the metal from the products of combustion and thereby prevents contamination and oxidation of the metal. The glass also insulates the metal from the heat source so that heat is transferred to the metal only by radiation through the glass and conduction through it. A smooth glass surface will reflect almost as much radiant heat as it will transmit. For this reason burner 13 is of a type known as a high velocity burner. This type of burner, many of which are available commercially, discharges gases at a high velocity against the surface of the glass to produce a rippled surface on the glass and a circulation and turbulence of the entire glass bath. These effects increase appreciably the heat transfer rate to and through the glass to the metal.

Burner 13 is so located in the furnace end wall that the hot gases from it contact the glass surface at an angle of approximately 30° from the horizontal. The glass cover should be thick enough so that the stream of gases from burner 13 will not blow the cover from the metal. It has been found that a layer of glass of from ¾ inch to 3 inches in thickness is satisfactory. Preferably the layer will be from 1½ to 2 inches thick.

When the metal has melted and reached pouring temperature, which can be ascertained by a thermocouple immersed in the metal, it is poured. This is accomplished by rotating the furnace on rollers 8 until the metal flows through opening 7. Just before the furnace is rotated for pouring, a plug of some suitable material such as wood or ceramic is used to close the opening until the furnace is rotated far enough for the glass level to be above the pouring opening. At this time the plug is removed so that only metal will flow through the opening. When pouring is completed the plug is reinserted in the opening before rotating the furnace back to melting position.

Another form which a furnace for carrying out the present invention can take, is shown in FIGS. 3 and 4. In these figures the furnace is indicated at 20 and is built in accordance with ordinary furnace practice and is mounted on a frame 21 so that it can be tilted in a manner described below. The furnace has a hearth 22 and the interior of the furnace is divided into a forward chamber and a rear chamber by means of a vertical wall 23 with a stack 24 extending upwardly from the rear chamber. Metal is poured from the forward chamber 22 through a depression 25 formed in the floor or hearth, which depression leads to a channel 26 and a pouring opening 29. The upper portion of the channel 26 is formed by a baffle 27 which is in effect a portion of the front furnace wall. A passage 28 extends through the wall to the pouring opening 29.

Burners 31 are provided in the forward chamber in the sides thereof. As shown herein the burners are four in number and are staggered on opposite sides of the furnace. The location of the burners 31 in one side of the furnace is shown in FIG. 3. The opposite side of the furnace would have the burners placed so that they were directed one between the burners 31 and the other between the right burner 31 and wall 23. In many cases it is necessary to provide an additional burner 32 in the back wall of the furnace with this burner being directed to discharge its products of combustion against the surface of the material being heated in that chamber. All of the burners used in this type of furnace are of the high velocity type which were mentioned in connection with FIG. 1.

The products of combustion discharged through stack 24 pass through an opening 33 in a cover plate 34. There is provided a baffle 35 over opening 33 to retard somewhat the products of combustion. The baffle also prevents material from being inadvertently dropped through the stack into the furnace. This baffle is surrounded by a collar 36 which serves to direct the products of combustion upwardly away from any workmen adjacent to the furnace. The cover is pivoted so that it can be moved out of the way in order to charge metal to be melted into the furnace through stack 24. To this end there is provided a bracket 37 on the cover, which bracket has a sleeve formed on it to receive a pivot pin 40 that is fastened to the frame of the furnace.

The furnace is provided with a plug 38 that is aligned with opening 28 so that by removing the plug the opening can be inspected or cleaned if this is necessary. There is also provided a drain opening 39 in the back wall of the furnace which is on a level with hearth 22. This opening is normally closed by a plug of suitable refractory material 41 that can be knocked out when the furnace is to be drained.

In this case the pouring spout 29 is on the end rather than the side of the furnace. In pouring metal from the furnace the furnace is tilted from the horizontal position shown in a counterclockwise direction around trunnions 42 substantially aligned with the exit of opening 29. These trunnions are received in bearings formed in supports 43 which are of a height to locate the pouring spout a convenient distance above the foundry floor. The tilting mechanism for the furnace includes a pair of brackets 44, one on each of the rear corners of the furnace frame 21. Each of these brackets has pivoted in it a nut 45 that is received by a threaded shaft 46 journaled in a support 47. This support is pivoted at 48 in a frame 49. Shaft 46 is rotated to raise or lower the nut 45, and thereby tilt the furnace, by means of gearing 51 from a motor 52 mounted on the support 47. This mechanism is preferably protected by a cover 53.

In the operation of this type of furnace, as in that previously described, sufficient glass, preferably cullet, to form a layer 55 over the metal 54 to be melted is placed in the furnace, and the burners ignited. Products of combustion passing beneath wall 23 sweep closely over the glass to help speed its melting. When the glass is melted, cover 34 is rotated to open position and metal to be melted is moved into the furnace through stack 24. The metal will be melted, as discussed above, by heat conducted through the glass cover. If the metal pieces are too large to sink immediately below the glass, that portion above the glass will be preheated by the escaping products of combustion as they move under wall 23 and up the stack.

All of the burners 31 are of the high velocity type mentioned above. Since the burners on opposite sides of the furnace are off-set with respect to each other, the hot gases discharged from them will not only ripple the surface of the glass cover, but will also create flow currents in the glass. These currents and ripples increase appreciably the heat absorbed by the glass and the speed of heat transfer to the metal.

The metal level is high enough, as shown in FIG. 3, so that it is above the upper edge of channel 26. Therefore, glass will not be poured from the furnace as it is tilted. The small area of metal surface in channel 26, and the pouring spout 29 are kept hot by that portion of the products of combustion which discharge through passage 28. The surface of the metal is so small that any contamination thereof by the products of combustion is negligible.

When pouring the metal, motor 52 is started to drive shaft 46 in a direction to raise nut 45 and thereby pivot the furnace around trunnions 42. The metal will flow through spout 29 to a suitable ladle or mold. From time to time it may be necessary or desirable to drain the furnace chamber of both metal and the glass. At such time motor 52 is energized to run in a direction to tilt the furnace clockwise in FIG. 3. When plug 41 is removed all of the material in the furnace will drain through opening 39.

By way of example only, it is noted that some brasses have a melting temperature of from 1700° F. to 1900° F. and a pouring temperature of from 2000° F. to 2200° F. Glass of the type mentioned begins to melt at about 1200° F. and may be heated to extremely high temperatures with the only noticeable effect being that it becomes more fluid as the temperature rises. For purposes of carrying out the invention the glass is normally heated to about 2400° F., or about 200° F. above the maximum temperature to which the brass is heated. This minimum temperature differential is sufficient to produce rapid heating of the metal, and is not high enough to cause or permit excessive zinc loss due to volatilization. At a temperature of 2400° F. the glass is fluid enough so that ripples can easily be made on its surface and currents set up in it to increase its rate of heating and transfer of heat to the metal.

The use of a glass cover over the metal being melted has several advantages. The glass serves to insulate the metal from the products of combustion, and thereby eliminates oxidation of the metal. The glass cover also helps to reduce zinc losses from brass. Without the cover, the bath's surface is directly exposed to the high temperature products of combustion, locally overheating its surface. Volatilization and consequent loss of zinc from brass is due to a combination of temperature and zinc vapor pressure. With the glass cover the bath's surface is not contacted directly by the high temperature products of combustion with the consequent local overheating that will increase zinc vapor pressure.

Increasing the glass surface by creating ripples in its surface, increases its temperature, and this, along with currents created in the glass by the high velocity gases from the burners, increases the rate of heat transfer from glass to metal.

It will, therefore, be seen that I have provided a metal melting furnace particularly adapted for melting brass and a method of melting that can use a furnace of this general type. The method results in heating the metal rapidly and with a zinc loss that is materially less than that usually encountered, and a smaller loss than usual of other elements.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of melting metal such as brass and the like in a furnace having a hearth which comprises placing a layer of molten glass over the metal on the hearth, applying heat to the surface of the molten glass in the form of hot products of combustion and radiant heat from the furnace walls, transferring heat from the glass to the metal and producing ripples in the surface of the layer of molten glass by directing a stream of hot gases against said surface thereby to increase heat transfer to the glass.

2. The method of melting metal such as brass and the like in a furnace having a hearth which comprises placing a layer of molten glass over the metal on the hearth, applying heat to the surface of the molten glass in the form of hot products of combustion and radiant heat from the furnace walls, transferring heat from the glass to the metal, and producing flow currents in the glass layer by directing a stream of hot gases against the surface thereof.

3. The method of melting metal such as brass and the like in a furnace having a hearth which comprises providing a layer of molten glass to cover the hearth, placing metal to be melted in the furnace to sink below the glass and be covered thereby, applying heat to the surface of the glass, and through the glass to the metal, and directing hot gases against the surface of the glass with velocity sufficient to produce ripples in its surface thereby to increase its surface area and heat absorbing capacity.

4. The method of melting metal such as brass which comprises melting glass in a furnace chamber to form a layer of liquid glass from ¾ inch to 3 inches thick, placing metal to be melted on said glass to sink through said layer of glass and be melted by conduction and radiation of heat through the glass, and supplying heat to the surface of the glass by directing products of combustion against said surface, the products of combustion being directed with sufficient force to produce ripples on said surface and create currents in said glass.

References Cited

UNITED STATES PATENTS

| 1,921,180 | 8/1933 | Evans | 75—76 |
| 2,516,536 | 7/1950 | Tschappat | 75—76 |
| 3,225,399 | 12/1965 | Belcher | 75—76 |

FOREIGN PATENTS

| 3,782 | 4/1890 | Great Britain | 75—57 |

HENRY W. TARRING II, Primary Examiner

U.S. Cl. X.R.

75—43, 72